M. S. BRINGIER, OF ASCENSION PARISH, LOUISIANA.

Letters Patent No. 87,821, dated March 16, 1869.

IMPROVED FOOD FOR DOMESTIC ANIMALS.

The Schedule referred to in these Letters Patent and making part of the same.

*To all whom it may concern:*

Be it known that I, M. S. BRINGIER, of the parish of Ascension, in the State of Louisiana, have discovered a new and useful Mode of Creating Food for Domestic Animals, by the conversion of bagasse into new forms and conditions; and I do hereby declare the following to be a full, clear, and exact description of the said discovery.

Bagasse is the name that has been given to sugar-cane after the juice has been expressed from it, and by which it is now universally known in all sugar-growing countries.

It accumulates in immense masses, wherever sugar is made from cane, and is the source of much trouble and annoyance, except when it is burned as fuel in the sugar-mills, for, save for that purpose, it has never heretofore been applied to any beneficial or economic use whatsoever. And yet the very poorest description of bagasse contains a very considerable residuum of saccharine and other nutritious matters; and it has only not been used as food for animals, because of the toughness and strength of the woody fibres in it, and the great length of the cane-stalks of which it is composed, these causes rendering it impossible for any animal to masticate or swallow it in its natural state.

These difficulties in the way of its use, I overcome by reducing the bagasse to pulp, or by cutting it into very small pieces, and then softening the mass by the action of steam, or by an infusion of water, either hot or cold.

To do this, I propose to employ the apparatus that is described by me in connection with my improved process of extracting saccharine matters from sugar-cane, for which I have obtained Letters Patent of the United States, bearing date November 12, 1867, and numbered 70,691, or any other suitable machine, whatever may be its peculiarities of construction and operation.

I have found, by experiments, that when thus prepared, bagasse is eaten with extreme avidity by nearly every domestic animal, such as horses, mules, kine, and the like, and by some preferably to the best description of hay; and that its fattening-properties are equal, if not superior to those of the best hay.

This being the case, my discovery utilizes what has always heretofore been considered a nearly worthless substance, by converting the same into good and nutritious food for animals.

The extent and value of my discovery may be estimated by the fact that in the State of Louisiana alone, at least two hundred thousand tons of this new article of food may be created, at a less cost than is now required to remove the bagasse out of the way, out of which it is made.

After the conversion of bagasse from its original into its new form, it may be dried and thus used, or it may be fed to animals in its moist state. They eat it, when either moist or dry, with the same greediness.

Having thus described my invention,

What I claim, and desire to secure by Letters Patent, is—

Converting bagasse into food for domestic animals, when the same is done in the manner and by the means substantially as herein described.

M. S. BRINGIER.

Witnesses:
    RUFUS R. RHODES,
    H. M. ROBINSON.